United States Patent
Wiley

Patent Number: 5,381,698
Date of Patent: Jan. 17, 1995

[54] FLOW-RESPONSIVE APPARATUS

[75] Inventor: Paris H. Wiley, Tampa, Fla.

[73] Assignee: Onicon Inc., Clearwater, Fla.

[21] Appl. No.: 863,859

[22] Filed: Apr. 6, 1992

[51] Int. Cl.[6] ............ G01F 1/06; G01F 1/28
[52] U.S. Cl. ................ 73/861.77; 73/861.75; 340/870.37
[58] Field of Search ........... 73/861.77, 861.78, 861.05, 73/861.75; 331/65; 324/166, 675; 340/870.37, 686

[56] References Cited

U.S. PATENT DOCUMENTS

| | | | |
|---|---|---|---|
| 3,187,256 | 6/1965 | Foster | 324/675 X |
| 3,701,041 | 10/1972 | Adler et al. | 331/65 |
| 4,006,411 | 2/1977 | Akagawa et al. | 324/61 R |
| 4,088,022 | 5/1978 | Kalotay | 73/231 R |
| 4,164,866 | 8/1979 | Mitchell et al. | 73/231 R |
| 4,310,807 | 1/1982 | McKee | 331/65 |
| 4,324,144 | 4/1982 | Miyata et al. | 73/861.77 |
| 4,404,860 | 9/1983 | Wood et al. | 73/861.78 |
| 4,462,262 | 7/1984 | Kahnke | 73/861.05 |
| 4,523,480 | 6/1985 | Inoue | 73/861.56 |
| 4,581,943 | 4/1986 | Feller | 73/861.05 |
| 4,790,195 | 12/1988 | Feller | 73/861.77 |
| 4,829,833 | 5/1989 | Feller | 73/861.77 |

FOREIGN PATENT DOCUMENTS

1140047.A  2/1985  U.S.S.R. ............ 73/861.77

Primary Examiner—Herbert Goldstein

[57] ABSTRACT

The disclosed flow monitoring apparatus has a flow-varied sensing capacitance and an inductor in a series-resonant circuit that modulates the frequency of an oscillator. In one apparatus, the sensing capacitance comprises a flow-activated vaned rotor whose blades sweep past a very small capacitive sensing electrode, for monitoring flow rates. In other apparatus a flow-activated blade is biased to remain opposite a very small capacitive sensing electrode, to provide on/off flow indication.

27 Claims, 5 Drawing Sheets

FLOW-RESPONSIVE APPARATUS

The present invention relates to apparatus for sensing the flow of fluids, and for providing flow-representing output that is useful for evidencing flow, or flow velocity, or volume of flow.

BACKGROUND OF THE INVENTION

Over the years, a substantial number of flow sensors have been developed that rely on a flow-activated element and one or more electrodes responsive to the flow-activated element. Some of those flow sensors rely on a range of conductivity of the fluid, thereby rendering them useless for sensing the flow of air and other gases and for sensing highly resistive or insulating liquids such as petroleum and its derivative liquids.

Some flow sensors involving sensing electrodes rely for their operation on the changes of capacitance occurring at a single sending electrode or electrode pair caused by a flow-activated element. Some of such flow sensors may be affected only incidentally by conductivity and other properties of the liquids to be monitored, but the intended dominant effect in such sensors is the capacitance changes caused by the flow-activated element at the sensing electrode(s).

"Capacitive flow sensors" (as they are called here) undergo changing capacitance at one or more sensing electrodes in response to flow-activated members in the sensing region. Among various known capacitive flow sensors are those which sense flow-induced capacitance changes at the sensing electrode(s) caused by an orbiting ball, and those which sense successive slender vanes of a flow-activated rotor such as a turbine rotor or a paddle wheel. A capacitive flow sensor may involve an array of sensing electrodes, or a pair of sensing electrodes, or a single localized sensing electrode, which are referred to below as "sensing electrode means".

An excellent form of capacitive flow sensor is one that relies on an inductance connected in series with the capacitance of capacitive sensing electrode means, disclosed in U.S. patent application Ser. No. 07/632,520, filed Feb. 13, 1991 and its continuation Ser. No. 08/020,908, filed Feb. 22, 1993 by Murray F. Feller. The sensing capacitance and the series-connected inductance form a series-resonant circuit, and the changing impedance of the series-resonant circuit due to alternating proximity and distance of each sensed flow-activated element relative to the sensing electrode modulates the amplitude of an excitation signal. Notably, that flow sensor is highly sensitive to the sweep of the edges of slender vanes or blades of a flow-driven rotor past a very small sensing electrode. A high degree of sensitivity is valuable in detection of the characteristically small capacitance changes at such small parts.

Maintaining that flow sensor in stable operation may require adjustments to take into account varied operating conditions, and stable operation may warrant limiting the Q of the series-resonant circuit which consequently limits the sensitivity of the apparatus. Moreover, for achieving greatest sensitivity there, a single sensing electrode is placed as close as is feasible to the path of flow-activated elements, consistent with practical limitations. The inherent shunt or stray capacitance of the sensing electrode (capacitance that is not caused to vary by the flow-activated elements) is minimized. This concern imposes its own exacting constraints on the practical design and construction of the sensing electrode and its connection to the series inductance.

SUMMARY OF THE INVENTION

The present invention is concerned with capacitive flow sensors incorporating a series-resonant circuit for sensing a flow-activated device. The invention is applicable to various forms of flow sensors such as orbital-ball flow sensors in which the flowing fluid causes a ball to travel in an orbital path past a sensing electrode or between a pair of electrodes. The invention has special application to flow detectors in which a flow-activated element is moved close to and away from a localized capacitive sensing electrode in response to flowing fluid. The invention notably provides capacitive flow sensors in which the capacitance and capacitance changes to be detected are very small, as in some forms of flow sensors having thin vanes or blades whose edges sweep past the localized sensing elements of the capacitive flow sensor.

In most of the illustrative embodiments of the invention described in detail below, the capacitive flow sensor utilizes the changes in capacitance produced when a turbine blade (or any other object) passes a metal sensing plug. In one embodiment, the flow activated element is only shifted nearer to or farther from the sensing plug, as an "on-off" indicator. The capacitance changes occur in the sensing region between the sensing plug and the rest of the universe in which the plug is located, or between the sensing plug and a companion electrode In each of the embodiments there is a network of impedances that includes the capacitance of the sensing means connected in series with an inductance and forming a series-resonant circuit, having a series-resonant frequency. The series-resonant circuit also has a parallel-resonant frequency due at least partly to stray capacitances of the circuit that are effectively in parallel with the series-resonant circuit. The parallel-resonant frequency is higher than the series-resonant frequency. At times, the series-resonant circuit is referred to below as a series parallel resonant circuit.

In flow monitoring apparatus having a capacitive flow sensor and an inductance connected in a series-resonant circuit, in which a capacitive sensing electrode of the flow sensor is connected to a terminal of the inductance, stray capacitance inherently shunts the capacitive flow sensor; such stray capacitance degrades the sensitivity of the flow sensor. In the Feller patent application, supra, and in the illustrative embodiments of this invention, that stray capacitance (and its degrading effect on the sensitivity of the apparatus) are minimized. The capacitive sensing electrode is placed adjacent to or in close proximity to the terminal of the inductance to which it is connected; and said sensing electrode and said terminal of the inductor are connected directly to each other and only to each other.

The series-resonant circuit of the capacitive flow sensor and the inductance, here as in Feller supra, inevitably has additional stray capacitance from one end terminal to the opposite end terminal of the series-resonant circuit. Here (but not in Feller, supra) such additional stray capacitance has the remarkable effect of enhancing the sensitivity of the flow monitoring apparatus.

In each of the embodiments in the present application there is an amplifier, so connected to the network of impedances as to constitute a frequency-modulated oscillator. When the oscillator is operating, its frequency is between the series-resonant frequency and the parallel-resonant frequency. The oscillator frequency at any moment is a function of the relationship between the sensing electrode(s) and the flow-activated element in the sensing region. Some form of detector or demodulator provides an output signal representing the flow.

A particularly effective form of the novel flow sensors utilizes a sensing capacitance comprising a single sensing electrode or plug, wherein the electric capacitive field in the sensing region extends between the plug and the miscellany of structure in the vicinity, that grounded structure extending from the oscillator. The series/parallel resonant circuit forms part of a pi network in a Hartley oscillator in exemplary embodiments detailed below. The Colpitts form of oscillator incorporating the series/parallel resonant circuit as part of the pi network is an effective alternative.

The oscillator operates continuously in one form of the apparatus, developing frequency-modulated signals that are a reflection of the changing relationship between a capacitive flow sensor and its flow-activated blades or other elements. In similar apparatus that utilizes any of various forms of capacitive flow sensors, the oscillator operates in a different mode. For part of the range of capacitance change in the capacitive flow sensor, the oscillator operates in the same manner as has already been described, its frequency varying as the sensing capacitance changes. For some further part of the capacitive sensor's range, oscillations cease. An on/off sequence of oscillations provides a basis for deriving flow-representing signals by means of an extremely simple circuit.

The novel flow sensors are capable of attaining high sensitivity for responding to the effect of flow-activated elements even when a single very small discrete capacitive sensing electrode is used and even when the flow-activated elements are slim vanes or blades. This trait applies in common to flow-sensing apparatus operating in either of the modes described.

The nature of the invention in its varied aspects will be best appreciated from the following detailed description of illustrative embodiments and the accompanying drawings.

DETAILED DESCRIPTION OF ILLUSTRATIVE EMBODIMENTS

Referring now to the drawings, an insertion-type flow-sensing probe 10 (FIG. 1) includes a frame 12 in which a flow-activated turbine rotor 14 is supported. The pivotal axis of the rotor is aligned with the path of the flow in pipe 16. This pipe has a hole 16a through which frame 12 is inserted into the pipe. Frame 12 is fixed to a hollow shaft 18 that may be of substantial length. Shaft 18 contains a wire 20 that provides a circuit-connection to the flow sensor of the probe, including an electrode (not shown in FIG. 1) close to the path of the turbine's vanes. A sealing structure 22 fixes the probe to the pipe. Structure 22 may be a known form that enables the probe to be installed in a pre-existing pipe containing liquid under pressure.

Figures 1, 4:
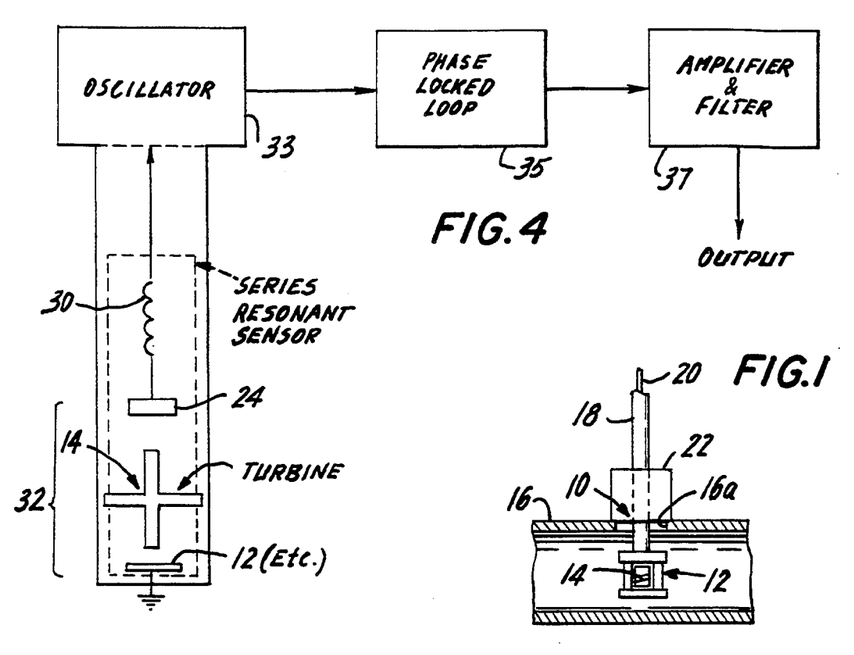
FIG. 1 is a diagrammatic view of a so-called insertion-type flow sensing probe, inserted in a pipe that is shown in cross-section.
FIG. 4 is a block diagram of novel flow-sensing apparatus incorporating the probe of FIGS. 2 and 3.

Mechanical details of the probe, lacking from FIG. 1 or only partially described here, may be found in U.S. Pat. No. 4,399,696, issued Aug. 23, 1983, and are incorporated here by reference. As seen there, two flow-activated rotors are at times advantageous in a probe. Thus, the single-rotor probe of FIGS. 2 and 3 is illustrative; it provides a suitable basis for understanding various aspects of the invention.

Figure 2:
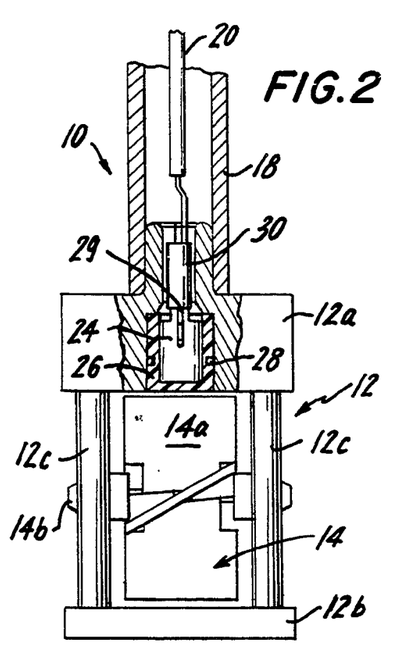
FIG. 2 is an elevation of a flow-sensing probe of the insertion type, shown partly in cross-section, containing series-resonant components used in the present invention.
Figure 3:
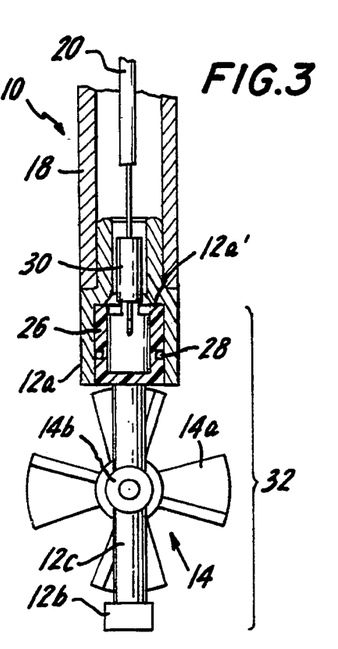
FIG. 3 is another elevation, seen from the left of the flow-sensing probe of FIG. 2, shown partly in cross-section.
Figure 17:
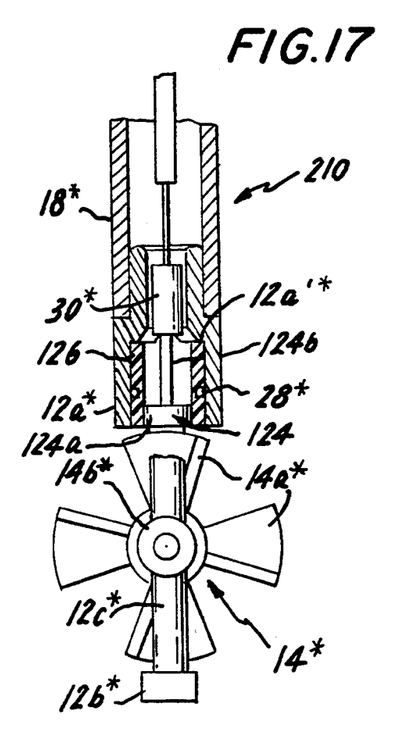
FIG. 17 is a lateral view, partly in cross-section of a capacitive flow sensor useful as part of novel flow-sensing apparatus, being a modification of FIG. 3.

In FIGS. 2 and 3, frame 12 of the probe includes a head 12a, a bottom bar 12b and side posts 12c. These may all be of corrosion-resisting metal such as brass, as may be appropriate to the liquid to be monitored. Head 12a may also be of a suitable plastic, or it may be a composite of metal and plastic. Head 12a in FIGS. 2 and 3, and head 12a* in FIG. 17, are cross-hatched to represent any suitable material.

Turbine rotor 14 is shown as having four blades 14a. The rotor turns about pivots in bearings 14b carried by posts 12c. The axis of the pivots is to be aligned with the flow path of the fluid. Head 12a of the frame contains a metal plug 24 that constitutes a discrete capacitive sensing electrode. Cup 26 of insulating plastic contains plug 24. The upper edge of cup 26 abuts a shoulder 12a' inside head 12a. When the lower end of cup 26 is subjected to considerable fluid pressure, the cup's abutment with shoulder 12a' holds the cup in place.

The bottom of the cup serves several purposes. It is a chemically inert protective cover for the metal sensing electrode. It is also an electrical insulator that minimizes the effect of the conductivity of the liquid being monitored as a factor in the sensing process. Being largely immune to a wide range of liquid resistivities adapts the apparatus to use with many liquids without concern for their resistivities. The side wall of cup 26 also provides insulation for the plug when head 12a is made of metal. An O-ring seal 28 between cup 26 and head 12a blocks leakage from the pipe into the probe.

Coil 30 is an inductive impedance connected to the sensing electrode 24 at a common junction 29, and coil 30 is connected by wire 20 to the excitation and flow-providing circuit. Common connection 29 is connected only and directly to electrode 24 and coil 30, and one terminal of coil 30 is adjacent to, i.e., in close proximity to, sensing electrode 24 (FIGS. 2 and 3) as in said Feller patent application '908 mentioned above.

An electric field develops between sensing electrode 24 and a second or companion capacitive electrode, largely frame 12 in FIGS. 2 and 3. The companion electrode theoretically includes all conductive structure near sensing-capacitive electrode 24 and far away—the "universe" of the sensing electrode—that provides a return path to the energizing and signal-deriving circuit. Sensing electrode 24 and its companion electrode, and the material between them, comprise sensing capacitance Cs. The value of the capacitive impedance 32 varies with the frequency. At series-resonance, junction 29 is the high-potential, high-impedance point in the series-connected inductive and capacitive impedances 30, 32, while the opposite-end terminals (wire 20 and ground) are at low potential, low-impedance points in the circuit. There is no branch circuit at junction 29 that could degrade impedances 30, 32 as a series-resonant circuit.

The excitation field that develops in operation is diffuse or broadly distributed at the surfaces of the second or companion sensing electrode 12 (etc.), but it is concentrated at and near discrete sensing electrode 24. That field concentration results in a first value of the sensing capacitance when there is no vane 14a opposite to the sensing electrode. A higher or lower capacitance develops when a vane 14a is opposite to sensing electrode 24 depending on the comparative electrical properties of the rotor and the fluid. Except as in FIG. 12, the companion electrode 12 (etc.) is connected to circuit ground as in FIG. 5.

The turbine rotor is made of molded plastic for monitoring a wide range of fluids. The rotor material ordinarily should have a dielectric constant (permittivity) that contrasts with the dielectric constant of the liquid, or of air or other gas to be monitored.

When the fluid's dielectric constant is low and that of the plastic is high, there is a momentary increase in capacitance as the vane passes through the high field concentration opposite to the sensing electrode. There is a dip in the capacitance of a capacitive flow sensor in which the dielectric constant of the vanes is low and that of the fluid is high when a vane passes through said high field concentration.

In some applications of the apparatus, it is useful to make the turbine rotor of conductive plastic or of metal. High conductivity of the rotor simulates a very high dielectric constant.

In FIG. 4, the sensing capacitive impedance 32 and coil 30 constitute a series circuit having a series-resonant frequency Fs that varies as the rotor's vanes pass the sensing electrode 24. That circuit also has a parallel-resonant frequency Fp (discussed below). Accordingly, the series connected impedances 30 and 32 are at times called a "series/parallel resonant circuit" below.

Series circuit 30, 32 is a frequency-determining portion of oscillator 33 (FIG. 4). A conventional phase-locked loop 35 is a frequency demodulator or detector responsive to frequency variations of the oscillator. Output from frequency demodulator 35 is suitably amplified and filtered in circuit 37 whose output is supplied to any desired utilization devices. An output pulse is developed for every vane 14a of the turbine as it passes electrode 24. The frequency of the pulses represents the rate of flow; each pulse represents a increment of volume that passes the flow sensor, and the integrated succession of pulses represents the volume of flow over any time interval.

Figure 5:
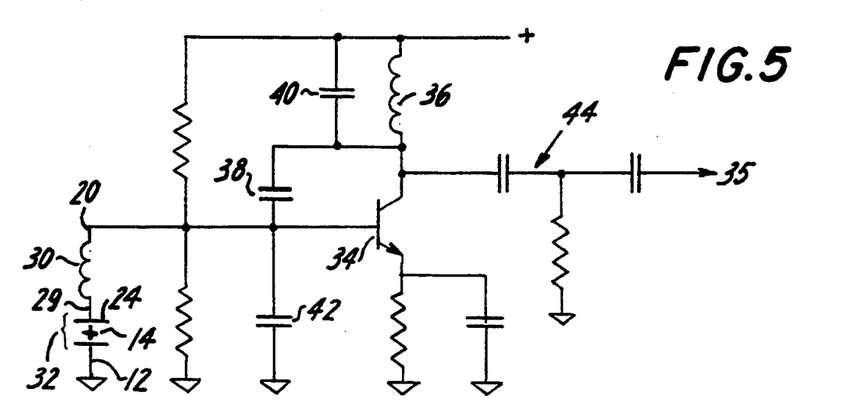
FIG. 5 is a circuit diagram of an illustrative form of oscillator for the apparatus of FIG. 4.

FIG. 5 is the wiring diagram of an oscillator incorporating series/parallel resonant circuit 30, 32 for developing frequency-modulated signals. The oscillator (including flow sensor 32) is proportioned to operate continuously. Each back-and-forth swing of frequencies represents a turbine vane passing the sensing electrode 24. The circuit of FIG. 5 is a basic common-emitter Hartley oscillator having a pi filter or feedback network- Oscillations are sustained for all of the flow-induced values of Cs.

Transistor 34 is an illustrative form of amplifier. The pi feedback network includes coil 36 connected to the transistor's collector as an inductive leg of the pi filter, capacitor 38 is the bridge of the pi, and the series/parallel resonant circuit 30, 32 is the other leg of the pi.

Figure 7:
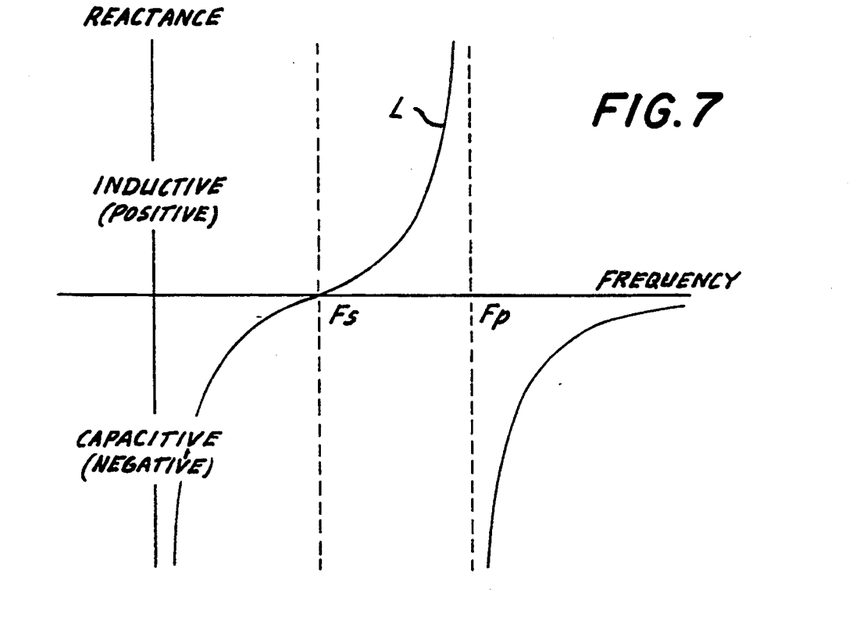
FIG. 7 is a diagram of impedance-versus-frequency variation of the series/parallel resonant circuit.

In the distinctive form of the apparatus here being considered, the oscillator is proportioned to operate continuously over the whole range of capacitance variation of the flow sensor 32. Over that range of capacitance variation, circuit 30, 32 is an inductive leg of the pi (note FIG. 7) in the oscillator. The other leg of the pi, consisting primarily of coil 36, is also inductive in the operating range of frequencies. Coil 36, shunted by capacitor 40 if needed, resonates at a frequency that is higher than the upper limit of the operating range of the oscillator. Bridging capacitor 38 of the pi may also be useful as an adjustment to promote sustained operation of the oscillator for the range of variation of the sensing capacitance 32.

Figure 6:
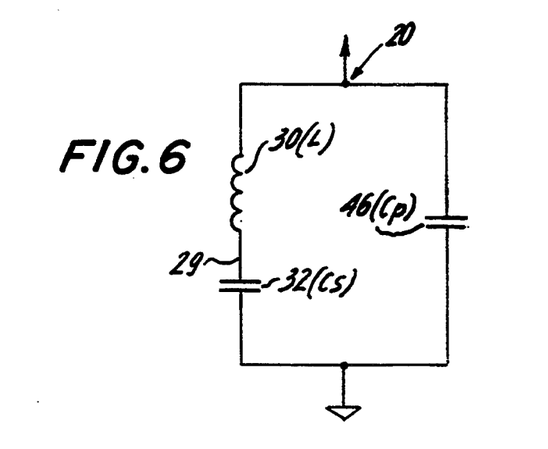
FIG. 6 is an equivalent circuit of a series/parallel resonant circuit shown in FIG. 4.

FIG. 6 is an equivalent circuit of the series/parallel resonant circuit that primarily comprises the impedances 30 and 32. Sensing capacitive impedance 32 and the series inductive impedance 30 have a series-resonant frequency FS which varies as the turbine blades traverse electrode 24. Distributed stray or shunt capacitances abound, some small and others more significant; they are lumped in FIG. 6 as a parallel capacitance 46, also designated Cp. The parallel capacitance Cp acting with series/parallel resonant circuit 30, 32 determines a parallel-resonant frequency Fp that is higher than the series-resonant frequency Fs. Increases in the value of Cp—as by adding capacitor 42 (FIG. 5)—shift the parallel-resonant frequency Fp closer to the series-resonant frequency Fs. As is explained below, an increase of Cp enhances the proportional effect of flow sensor 32 in causing the oscillator's frequency to vary, thereby increasing the sensitivity of the flow sensing apparatus.

High sensitivity and tolerance of the circuit to relatively large amounts of stray capacitances also contribute to easing constraints in the design of sensing electrode 24 and of the whole flow sensor 30, 34. The plug form of the sensing electrode in FIGS. 2 and 3 is eminently practical. Electrode 24 can be quite rugged, such as the plug 24 in FIGS. 2 and 3. Stray capacitances of coil 30 and wire 20 need not be minimized.

High sensitivity of the flow sensor is especially important for allowing relatively wide separation between the face of sensing electrode 24 and the path of the rotor vanes' edges as they pass the sensing electrode. Non-critical spacing or clearance at the vanes' edges promotes good mechanical design of the flow sensor's structure. Wide spacing renders the rotor less easily blocked, as by dirt. In addition, ample sensitivity is available even when the bottom of cup 26 is made relatively thick for resisting fluid pressure that may be encountered.

Sensing electrode 24, shown as a plug, does have stray capacitance to ground. That stray capacitance does not participate in the capacitance variation caused by rotor 14 and thus that stray capacitance degrades and in a sense dilutes the flow-representing capacitance variation. However, accepting that dilution is more than compensated by the rugged non-critical form of plug 24. Ample sensitivity of the flow sensor is readily attainable despite such dilution. In common with the Feller application '809, supra, one terminal of coil 30 is adjacent to—in close proximity to—sensing electrode 24 so that junction 29 constitutes a direct conductor that connects the coil to the sensing electrode and only to the sensing electrode. Consequently, connection 29 adds only minimally to the stray capacitance of sensing electrode 24 to ground, shunting the sensing capacitance.

In the following formulas, L is the inductance of coil 30 and Cs is the capacitance of sensor 32. The resonant frequencies Fs and Fp are:

$$Fs = \frac{1}{2\pi\sqrt{L \cdot Cs}} \text{ and } Fp = \frac{1}{2\pi\sqrt{L \cdot Ceq}}$$

where $$Ceq = \frac{Cs \cdot Cp}{Cs + Cp}$$

For analysis, it may be considered that Cp is much smaller than Cs. The equivalent capacitance Ceq is then approximately equal to Cp. Then $$Fp \approx \frac{1}{2\pi\sqrt{L \cdot Cp}}$$

Fp being virtually independent of Cs. In this condition, changes of Cs occurring as the rotor turns will result in shifts of Fs but Fp remains essentially constant. The frequency (or range of frequencies) of the oscillator is varied between Fs and Fp. In an example, if the highest oscillator frequency is halfway between Fs and Fp, the change in the oscillator frequency due to changes in Cs will be ½ the change of Fs.

Continuing the analysis, it may be considered that Cp is much larger than Cs, so that Ceq is approximately equal to Cs and Fs and Fp are very close together. Also, since $$Fp \approx \frac{1}{2\pi\sqrt{L \cdot Cs}}$$

Fp will change virtually as much as Fs when the turbine turns and Cs changes. Changes in oscillator frequency during turbine rotation approach the changing Fs. It follows that larger values of Cp promote greater change in oscillator frequency for any given change in Cs. Within eminently practical limits, the circuit tolerates—and is even helped by—larger values of Cp. (The result of a large value of Cp is just the opposite in a flow sensor that depends only on the impedance variations caused by flow-activated variations in the sensing impedance, because in such apparatus Cp shunts, and tends to mask the impedance changes.)

The Hartley oscillator form of the flow sensor in FIG. 5 has many attractive attributes. As one advantage, only one discrete connection 20 is made to the sensing probe, greatly simplifying the sensor's construction. This is in contrast to an alternative (see FIG. 12) in which there are two ungrounded connections to the series circuit 30-5, 32-5.

The circuit of FIG. 5 (as already noted) is a Hartley oscillator using a pi feedback network. The common connection of inductive leg 36 and the capacitive bridge 38 of that pi network is to the collector of transistor 34 and the other leg 20, 30, 32 is to the transistor's base. This feedback network is inverting, its connections to the base and to the collector of amplifier 34, respectively, being oppositely phased.

Figure 8:
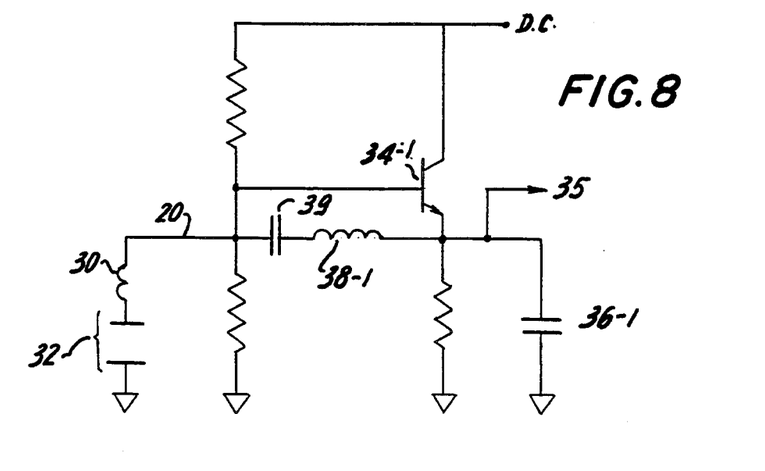
FIGS. 8 and 9 are circuit diagrams of oscillators alternative to that of FIG. 5.

FIG. 8 shows a flow sensor 30, 32 in which a non-inverting pi feedback is used in a Hartley oscillator. Capacitor 36-1 forms one leg of the pi feedback network, inductor 38-1 forms the bridge and the sensing impedances 30, 32—the same as in FIG. 5—form the other leg of the feedback network. The common connection of the inductive bridging impedance 36-1 and the capacitive leg 38 is to the emitter of the transistor amplifier 34-1. Output to phase locked loop 35 (FIG. 4) is taken from the emitter. Capacitor 39 is a large d-c blocking capacitor. The insulating cup 26 (FIG. 2) in the capacitive sensing structure provides d-c blocking in leg 20, 30, 32.

Figure 9:
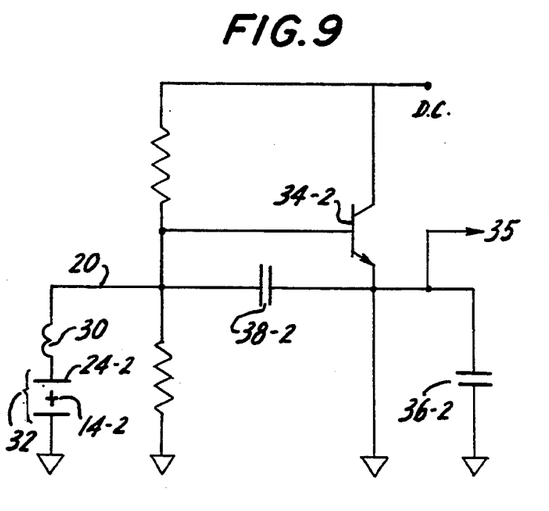

FIG. 9 shows a flow-sensor in which a non-inverting pi feedback network is used in a Colpitts oscillator. Capacitor 36-2 forms one leg of the pi feedback network, capacitor 38-2 forms the bridge, and the same sensing impedances 30, 32 as in FIG. 5 form the second leg of the pi network. Capacitive impedances 36-2 and 38-2 have a common connection to the emitter of transistor amplifier 34-2. The emitter provides output to phase locked loop 35. In common with the Hartley oscillator of FIG. 8, the Colpitts oscillator of FIG. 9 involves only one wired connection 20 (additional to the metallic ground) to the probe.

Figure 10:
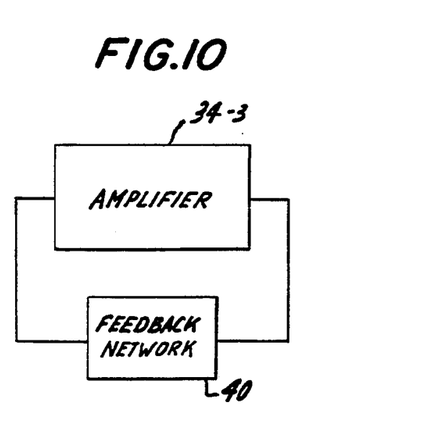
FIG. 10 is a generalized block diagram of an oscillator.
Figure 11:
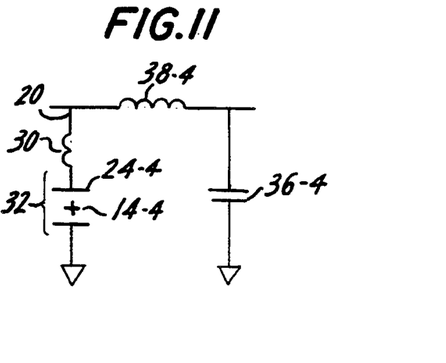
FIGS. 11 and 12 are circuit diagrams of feedback networks for oscillators.

Considering any oscillator to consist of an amplifier 34-3 and a feedback network 40 (FIG. 10) still other forms of feedback networks can be adopted. The non-inverting pi feedback network in FIG. 11 may replace that in the Hartley oscillator of FIG. 8. In FIG. 11, a capacitor 36-4 forms one leg of the pi network, inductor 38-4 forms the bridge, and the same series sensing impedance 20, 30, 32 as in FIG. 5 forms the second leg of the pi network. The common connection of capacitor 36-4 and inductor 38-4 may be connected to the emitter of a transistor amplifier as in FIG. 8. In this circuit, the series-connected sensing impedances 20, 30, 32 may be interchanged with the bridging impedance 38-4; but then the rotor sensing structure would need a second discrete sensing electrode that is not grounded.

Figure 12:
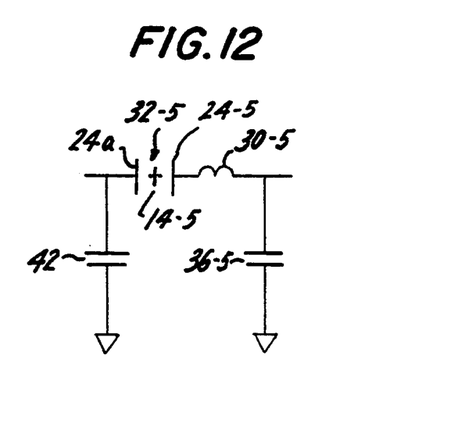

FIG. 12 illustrates diagrammatically an inverting pi feedback network useful for a Colpitts oscillator, such as that in FIG. 9. This network includes two capacitors 36-5 and 42 as its legs and a modified series/parallel resonant circuit 30-5, 32-5 as its bridge. Sensing capacitance 32-5 includes sensing electrode 24-5 like electrode 24 (FIGS. 2 and 3), a second electrode 24a, and a turbine rotor 14-5 like that of FIGS. 2 and 3. Electrode 24a may be an oppositely disposed duplicate of sensing electrode 24-5 with little clearance from the path of the turbine blades' edges. As an alternative, electrode 24a may resemble frame 12 (FIGS. 2 and 3) provided that such frame is insulated from grounded structures and is arranged (by spacing) as the dominant return electrode for the flux of the field developed at electrode 24-5.

The oscillator and feedback circuits described above and shown in the drawings are illustrative, but others may be used. Thus, T-type feedback networks can replace pi filters in suitably designed oscillators.

Figure 13:
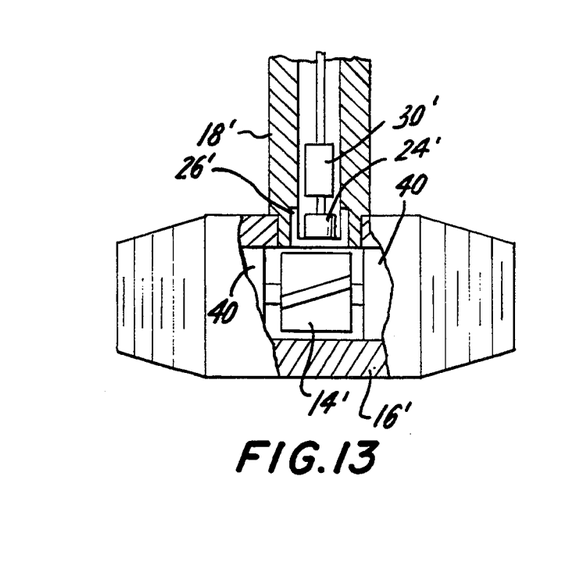
FIG. 13 is a lateral view, partly in cross-section, of an in-line flow sensor incorporating a modification of the flow sensor of FIGS. 1-3.

It was noted above that FIGS. 1–3 represent a so-called probe-type flow sensor. Another conventional form is the in-line flow sensor, represented in FIG. 13. Components in FIG. 13 bearing primed numerals are similar to or identical to the correspondingly numbered parts in FIGS. 1–3; their description is not repeated here. Pipe 16' in FIG. 13 is much smaller in diameter than pipe 16, compared to the diameter of the turbine rotor. In FIG. 13, pipe 16' and rotor 14' are coaxial. Replacing frame 12 of FIGS. 1–3 as the support for the turbine rotor in FIG. 13, there are two sets of flow-guiding vanes 40, 40 of insulation, fixed in pipe 16'. Those sets of vanes support the pivots of the turbine rotor. The sensor of FIG. 13 is useful with the same circuits as those described above; operation of FIG. 13 in flow-sensing apparatus is essentially as described above.

In still other forms of flow sensors, turbine rotor 14 (FIG. 1) or 14' (FIG. 13) is replaced by other forms of flow-activated devices that move repeatedly past the sensing electrode. Other flow-activated rotors include paddle-wheel rotors or simple fans. In still other flow sensors, a flow-activated ball travels in orbits past a sensing electrode or between paired electrodes. See for example, U.S. Pat. No. 4,462,262, issued Jul. 31, 1984 to Kahnke. The frequency-modulated oscillator circuits that respond to the turbine blades 14a as discussed above are also highly effective in responding to such alternative flow-activated devices.

Figure 14:
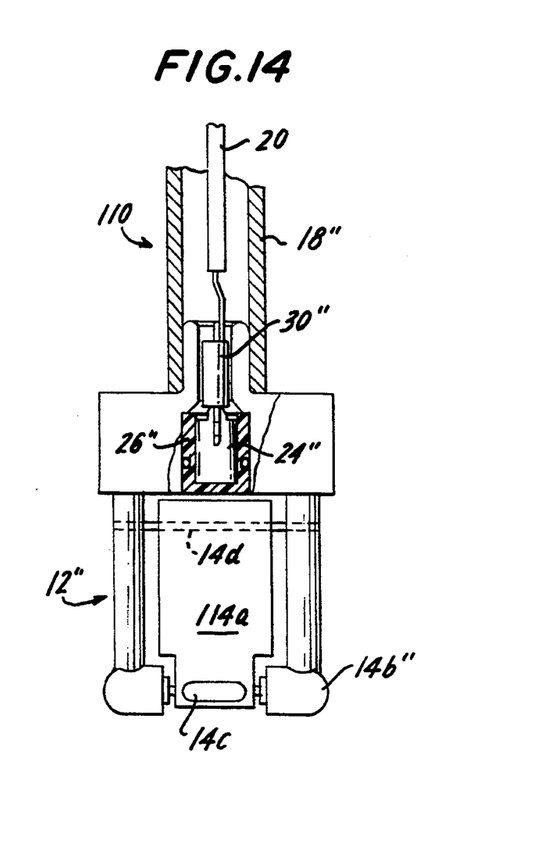
FIGS. 14 and 15 are front and side elevations, partly in cross-section, of a modification of the device in FIGS. 2 and 3.
Figure 15:
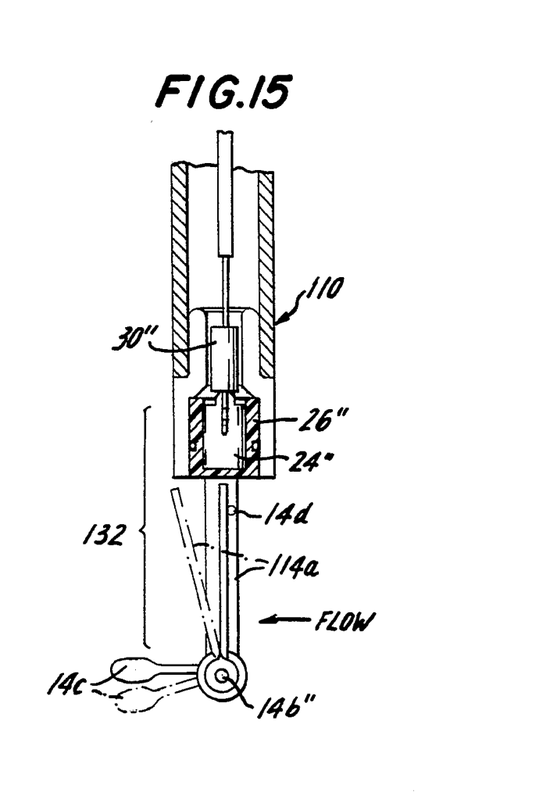

FIGS. 14 and 15 are views of a form of flow-responsive apparatus 42, having as its only purpose the detection of some minimum flow rate. A flow rate less than the minimum represents "no flow"; above the minimum represents "flow". Most of the flow-sensing structure in these figures is identical to that of FIGS. 2 and 3; the parts in FIGS. 14 and 15 bear the same reference numerals as in FIG. 3, distinguished by --"--. There is no need to repeat their description.

Replacing turbine rotor 14, the apparatus of FIGS. 14 and 15 has a single flow-responsive blade 114a as of molded plastic having a dielectric constant contrasting with that of the of the fluid to be monitored. Blade 114a is upright. It has a pivotal support 14b" at its lower margin; its upper edge is centered opposite sensing electrode 24" when there is no flow. A buoyant arm 14c extending from blade 114a biases the blade clockwise in FIG. 15 to assume the upright position shown, against a fixed rod 14d carried by frame 12".

Flow of fluid from right to left in FIG. 15 tilts blade 114a into its dotted-line position, out of proximity to electrode 24. As this occurs, the capacitance of the sensor and its capacitive impedance change, because the permittivity of the material in the field of the sensing electrode changes.

Figure 16:
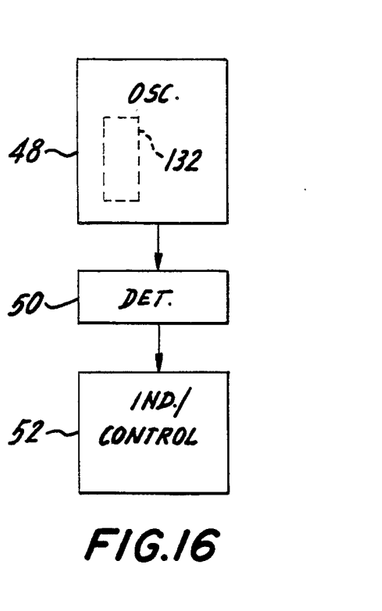
FIGS. 16 is a block diagram of "on/off" flow responsive apparatus incorporating the flow sensor of FIGS. 14 and 15.

FIG. 16 is the block diagram of apparatus utilizing the sensor 132 of FIGS. 14 and 15. That apparatus includes an oscillator 48 (which may be that shown in FIG. 5 or any of its alternatives) and a detector 50, and output means such as an indicator or control 50. Flow sensor 132 is a frequency-controlling portion of the oscillator. Detector 50 responds to sensor 132 by providing two different levels of output when blade 114a is upright and when blade 114a is in a tilted position, shown in dotted-lines in FIG. 15. The frequency shift of the oscillator results in an "on" or "off" indication or control output, corresponding to conditions of "flow" or "no flow".

The oscillators that utilize flow sensors 32 and 132 are in continuous oscillation throughout the range of variation of their sensing capacitances. The impedance of series/parallel circuit 30, 32 remains inductive throughout the frequency range Fs to Fp (FIG. 7), noting that Fs changes as the sensing capacitance Cs changes. The criterion for sustained oscillations is that the loop gain through the amplifier and the feedback network must be greater than unity, at the frequency for which the phase shift of the feedback around the loop is 0°. This criterion is satisfied in ordinary circuit design of the flow-monitoring apparatus thus far described, throughout the range of the capacitive sensor.

Another mode of operation can be achieved with modified apparatus that retains the series/parallel resonant circuit of each apparatus discussed above. In the mode of operation of the modified apparatus, frequency modulated oscillation occurs during part but not all of the range of variation of the sensing capacitance Cs caused by a flow-activated element. During that part of the capacitive sensor's range, the oscillator functions in the same manner as in the apparatus described above: frequency-modulated oscillations are generated. During the remainder of the range of the capacitive sensor's variation, the oscillator drops out of oscillation; the oscillations are interrupted.

This on/off mode of operation depends on the proportions in the design of the oscillator circuit and on related design of the capacitive flow sensor that forms part of the oscillator.

The condition of the modified circuit may be examined at a frequency at which the oscillator drops out of oscillation. This occurs if there is no frequency for which the phase shift of the feedback around the loop of the amplifier and the feedback network is zero. This result occurs, for example, when there is too great a disparity between the effective inductances of leg 36, 40 and leg 30, 32 in FIG. 5, each leg having its own inductive impedance. Low gain of the oscillator's amplifier is another factor promoting the on/off mode of oscillator operation. A still further factor is a capacitive sensing electrode having an especially wide range of capacitance variation in response to the flow-activated element or elements, in turn causing a relatively wide range of series-resonant frequencies.

Figure 18:
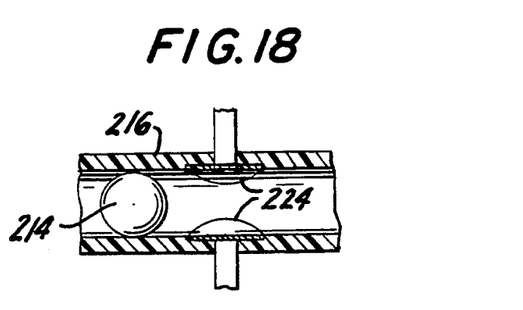
FIG. 18 is a fragmentary cross-sectional view of a further flow sensor useful in the novel flow sensing apparatus.

FIGS. 17 and 18 show capacitive flow sensors having relatively wide ranges of sensing capacitance variation. FIG. 17 is a modification of FIG. 3. In FIG. 17, each part bearing a numeral with an asterisk is identical to a like-numbered part in FIG. 3 so that description of such parts is superfluous.

Sensing electrode 124 in FIG. 17 has a head portion 124a and a slender supporting post 124b. (This post may be made shorter than shown.) An insulating sleeve 126 replaces cup 26 of FIG. 3, so that the exposed lower surface of sensing head 124a is as close as practical to the sweeping edges of blades 14a*. In this way, the range of variation of the sensing capacitance Cs is increased considerably as compared to the configuration in FIG. 3.

FIG. 18 shows another flow sensor that may be used in place of flow sensors 32 and 132. It includes a guide 216 which is part of an orbital track for flow-activated ball 214 made of insulation. Its dielectric constant differs from that of the monitored fluid. Two capacitive electrodes 224 are disposed opposite to each other in the form shown; they have ball-guiding surfaces that are shaped as portions of the ball-guiding track. The liquid whose flow is to be monitored guides the flow so as to cause the ball to orbit past the electrodes repeatedly as in U.S. Pat. No. 4,462,262 mentioned above. A single discrete electrode 124 can be used in a modification of FIG. 18. In an alternative form of orbital ball flow sensor, the electrodes and the flow-induced ball-orbiting configuration may be that in U.S. Pat. No. 4,581,943, issued Apr. 15, 1986 to Murray F. Feller. The disclosure of the capacitive ball-sensing electrodes and the ball-orbiting arrangement of the '943 patent are incorporated here by reference.

Relatively large values of ball-sensing capacitance and ranges of capacitance variation are attainable in such orbital ball flow-sensing arrangements and others. They may be part of an oscillator replacing sensing capacitance 32 in FIG. 5 and in FIG. 12, where such oscillators are proportioned as a whole to operate in an alternative on/off mode.

The on-off mode of operation of an oscillator having a capacitive sensor in a series/parallel resonant circuit, proportioned for the on/off mode of operation, can simplify greatly the circuit that derives flow-representing output.

Figure 19:
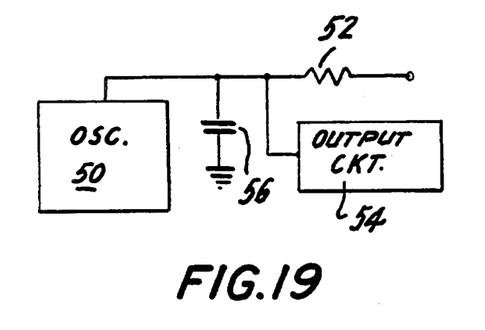
FIG. 19 is a block diagram of a circuit for deriving and utilizing flow-representing signals in flow-sensing apparatus proportioned to operate in an on/off mode.

FIG. 19 shows such a circuit. It has a frequency-modulated oscillator 50 having a suitable capacitive flow sensor, and it is proportioned to operate in the on/off mode. A resistor 52 is connected in series with its d-c supply. Changes in current drawn by the oscillator as it goes into and out of oscillation, develop changed voltage drops in resistor 52. Such changes constitute a flow-representing signal. That signal is supplied to output circuit 54. Oscillator-frequency signals are bypassed by capacitor 56.

The flow-sensing apparatus in its various forms detailed above has many distinctive attributes. As a capacitive-electrode flow sensor, it is usable for monitoring the flow of a wide range of fluids, whether a gas or a resistive liquid or an insulating liquid. It is capable of developing ample flow-representing signals even when the capacitive flow sensor has an extremely small sensing electrode that is used to respond to slim flow-activated blades or vanes.

The coil and the series-connected capacitive sensor in each embodiment form a series-resonant circuit that is at times referred to herein as a series/parallel resonant circuit; it has a series-resonant frequency Fs and a parallel resonant frequency Fp. The inherent stray capacitance that is a shunt across the series-connected impedances does not degrade the capacitive flow sensor's sensitivity. As demonstrated above, the sensitivity of the sensor is actually enhanced by that stray capacitance.

The various forms of the apparatus detailed above have their own distinctive properties, as noted above.

The illustrative forms of apparatus described above and shown in the drawings may be modified and variously applied by those skilled in the art. Consequently, the invention should be broadly construed in accordance with its true spirit and scope.

What is claimed is:

1. Apparatus for monitoring the flow of fluid, including an oscillator having frequency-modulating means including an inductive impedance and a capacitive impedance connected to each other as a series circuit having opposite-end connections and a common junction that only connects said impedances to each other, said oscillator including an amplifier and a frequency-determining feedback network, said series circuit constituting a component part of said feedback network and connected in said network at said opposite-end connections, said capacitive impedance including a flow sensor having a sensing capacitive electrode and flow-activated means coacting with said sensing capacitive electrode for modifying the capacitance of said capacitive impedance, said apparatus having significant stray as a shunt capacitance between said opposite-end connections of said series circuit, said series circuit thus comprising a series/parallel resonant circuit having a series-resonant frequency Fs and a parallel-resonant frequency Fp, the network being proportioned for causing oscillation at a frequency between Fs and Fp for at least part of the range of movement of the flow-responsive device.

2. Flow monitoring apparatus as in claim 1, wherein said apparatus includes further capacitance means shunting said tray capacitance for shifting Fp closer to Fs, thereby rendering the apparatus more sensitive to flow-responsive capacitive changes occurring in said flow sensor.

3. Flow monitoring apparatus as in claim 1, wherein said capacitive impedance comprises only one discrete localized electrode and a companion electrode, said flow-activated means being movable relative to said electrodes for modifying the capacitance between said electrodes.

4. Flow monitoring apparatus as in claim 1, wherein said flow-activated means comprises a rotor having blades whose edges are arranged to sweep past said sensing capacitive electrode and thereby modify the capacitance of the flow sensor cyclically, said apparatus further including means responsive to cyclic variation of the frequency of said oscillator for providing flow-responsive output.

5. Flow monitoring apparatus as in claim 1 wherein said flow-activated means comprises a member disposed in a position directly opposite said sensing capacitive electrode in the absence of flow but being movable away from said position in response to fluid flow, and means for yieldably maintaining said member in said position in the absence of flow, and means responsive to said oscillator for providing an indication of flow.

6. Flow monitoring apparatus as in claim 1, wherein said series circuit effectively constitutes an inductance at all frequencies of oscillation.

7. Flow monitoring apparatus as in claim 1, wherein said feedback network comprises a pi network having a capacitive bridge and a fixed inductive leg, said series circuit being connected in another leg of the feedback network and serving in part to control the oscillator's frequency in dependance on the relationship between said flow-activated means and said sensing capacitive electrode.

8. Flow monitoring apparatus as in claim 1, further including a frequency-modulation detector responsive to said oscillator for deriving flow-representing output.

9. Flow monitoring apparatus as in claim 1, wherein the oscillator is proportioned so that it generates frequency-modulated oscillations for only part of a range of motion of said flow-activated means relative to said sensing capacitive electrode, operation of said oscillator being interrupted when the flow-activated means is outside said part of said range of motion.

10. Flow-monitoring apparatus as in claim 9, further including a detector differently responsive to said oscillator when in oscillation and when oscillation is interrupted for providing a representation of the fluid flow.

11. Flow monitoring apparatus as in claim 1, wherein said capacitive impedance includes a localized sensing electrode connected directly to a terminal of said inductive impedance and wherein said inductive impedance is mounted so that said terminal is adjacent to said sensing electrode.

12. Flow monitoring apparatus including an impedance network and an amplifying device connected to each other, said network and said amplifying device comprising an oscillator, said impedance network including inductance means and variable capacitance means connected as a series circuit for providing control to the frequency of the oscillator, said variable capacitance means including at least one sensing capacitive electrode and a flow-responsive device movable relative to said sensing electrode for modifying the capacitance of said capacitance means and thereby modifying the frequency of the oscillator, said series circuit having parallel capacitance at least part of which is in the form of stray capacitance, the series circuit having a series-resonant frequency Fs and a parallel-resonant frequency Fp higher than Fs, the network being proportioned for causing oscillation of the oscillator at a frequency between Fs and Fp for at least part of the range of movement of the flow-responsive device.

13. Flow monitoring apparatus as in claim 12, further including output means variably responsive to said oscillator for providing flow-representing output.

14. Flow monitoring apparatus as in claim 12, further including frequency-demodulation output means responsive to said oscillator.

15. Flow monitoring apparatus as in claim 12, wherein said oscillator including said amplifier and said impedance network are proportioned so that oscillations develop or are interrupted in dependence on varying positions of said flow-activated device in relation to said sensing electrode.

16. Flow sensing apparatus as in claim 15, further including output means differently responsive to said oscillator when oscillating and when not in oscillation.

17. Flow monitoring apparatus as in claim 12, wherein said inductance means has a terminal connected directly to said sensing electrode and wherein said inductive impedance means is mounted with said terminal adjacent to said sensing electrode.

18. Flow sensing apparatus comprising inductance means and variable capacitance means connected as a series circuit, said series circuit having shunt capacitance and having a series-resonant frequency Fs and a parallel resonant frequency Fp, said variable capacitance means including at least one sensing electrode and a flow-responsive device variably cooperating with said sensing electrode for varying the capacitance said capacitance means, an amplifier, and a circuit network incorporating said series circuit connected to the amplifier to constitute an oscillator whose frequency is dependent on the relationship of said flow-responsive device to said sensing electrode, said network being proportioned so that said series circuit acts as an inductive component in the range of operation of the oscillator between Fs and FP.

19. Flow sensing apparatus as in claim 18, further including output means responsive to said oscillator for providing output dependent on the relationship of said flow-responsive device to said electrode.

20. Flow sensing apparatus as in claim 18, wherein said electrode means comprises a localized sensing electrode and companion electrode means, and wherein said flow-activated means comprises a rotor having blades whose edges are arranged to sweep past said localized electrode and thereby modify the capacitance of the flow sensor.

21. Flow sensing apparatus as in claim 18, wherein said series circuit includes a common junction that only connects said inductance means to said variable capacitance means.

22. Flow sensing apparatus as in claim 21, wherein said oscillator has ground terminal means, and wherein said variable capacitance means has a further electrode connected to said ground terminal means, said common junction comprising a conductor connecting said sensing electrode directly to a terminal of said inductance means, said electrode and said terminal of said inductance means being in close proximity to each other.

23. Flow monitoring apparatus as in claim 18, wherein said inductance means has a terminal connected directly to said sensing electrode and wherein said inductance means is mounted with said terminal adjacent to said sensing electrode.

24. Flow responsive apparatus including a frequency modulated oscillator having an amplifier and a frequency-controlling network connected to the amplifier, said frequency controlling network including an inductor and a variable capacitor, said inductor having first and second terminals and said variable capacitor including a localized sensing electrode and means constituting a companion electrode, said capacitor having flow-actuated means for varying the capacitance between said electrodes, means mounting said inductor and said capacitor with said first terminal in close proximity to said sensing electrode, and a conductor connecting said first terminal of the inductor directly to said sensing electrode, said second terminal of the inductor and said companion electrode forming opposite-end terminals of a series circuit, and said opposite-end terminals of said series circuit having respective connections which incorporate the series circuit in the network, said series circuit having significant parallel capacitance at least part of which is in the form of stray capacitance, the series circuit having a series-resonant frequency Fs and a parallel-resonant frequency Fp higher than Fs, the network being proportioned for causing oscillation of the oscillator at a frequency between Fs and Fp for at least part of the range of movement of the flow-responsive device.

25. Flow responsive apparatus as in claim 24, wherein said inductor and said variable capacitor are part of an assembly which is adapted to be secured to the wall of a pipe in such a manner as to dispose said flow-actuated means in the pipe for actuation by fluid flowing in the pipe.

26. Flow responsive apparatus as in claim 25, wherein said assembly includes an elongated support adapted to extend through the wall of the pipe and to support said inductor and said variable capacitor within the pipe, the aforesaid connection of said second terminal of the inductor in said network comprising a wire extending along said elongated support.

27. Flow responsive apparatus as in claim 24, wherein said sensing electrode and said first terminal of the inductor are connected only to each other.

* * * * *